April 29, 1958　　B. WOODWARD, JR　　2,832,387
POTATO SLICING MACHINE
Filed Sept. 2, 1955　　4 Sheets—Sheet 1
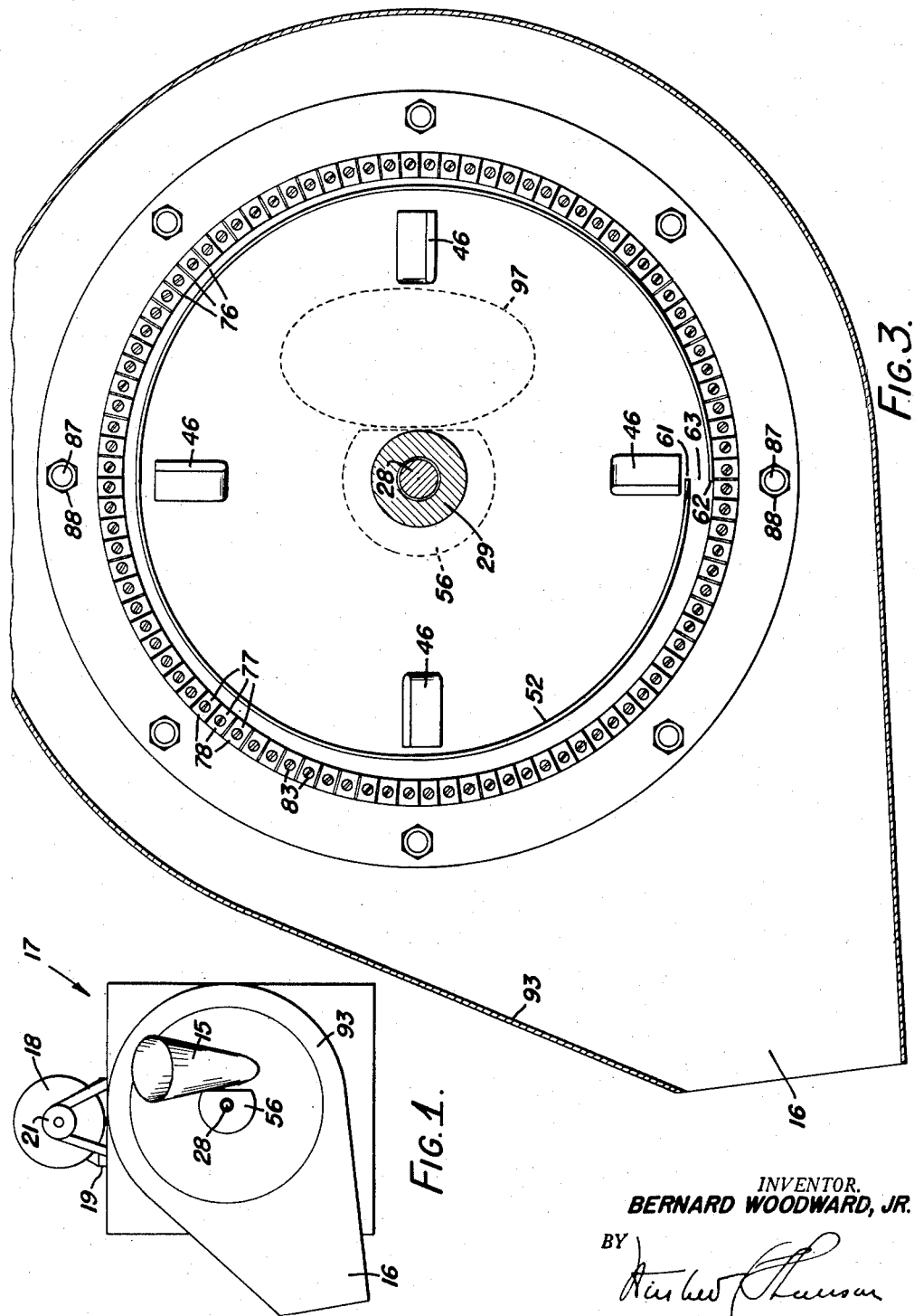
INVENTOR.
BERNARD WOODWARD, JR.
BY
ATTORNEY April 29, 1958  B. WOODWARD, JR  2,832,387
POTATO SLICING MACHINE
Filed Sept. 2, 1955  4 Sheets-Sheet 2

INVENTOR.
BERNARD WOODWARD, JR.
BY
ATTORNEY

April 29, 1958  B. WOODWARD, JR  2,832,387
POTATO SLICING MACHINE

Filed Sept. 2, 1955  4 Sheets-Sheet 3

INVENTOR.
BERNARD WOODWARD, JR.
BY
ATTORNEY

April 29, 1958 B. WOODWARD, JR 2,832,387
POTATO SLICING MACHINE
Filed Sept. 2, 1955 4 Sheets-Sheet 4
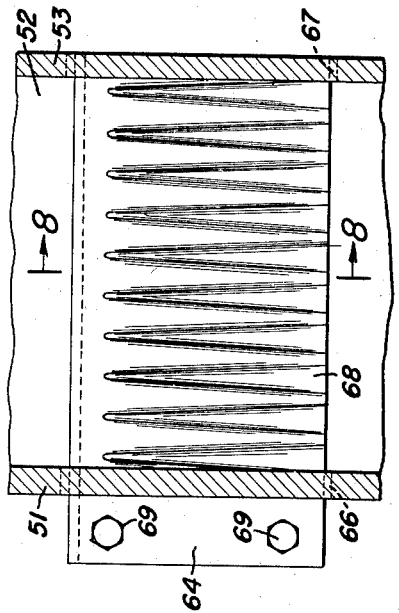
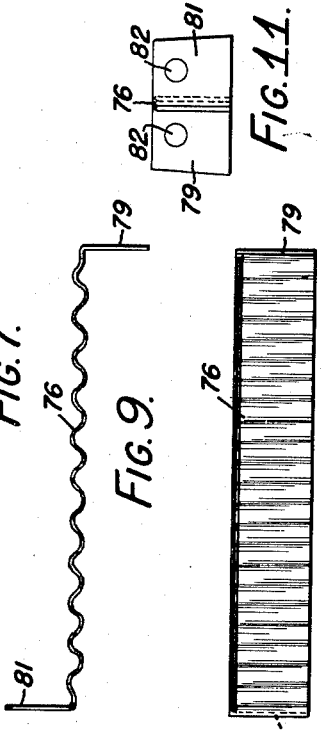
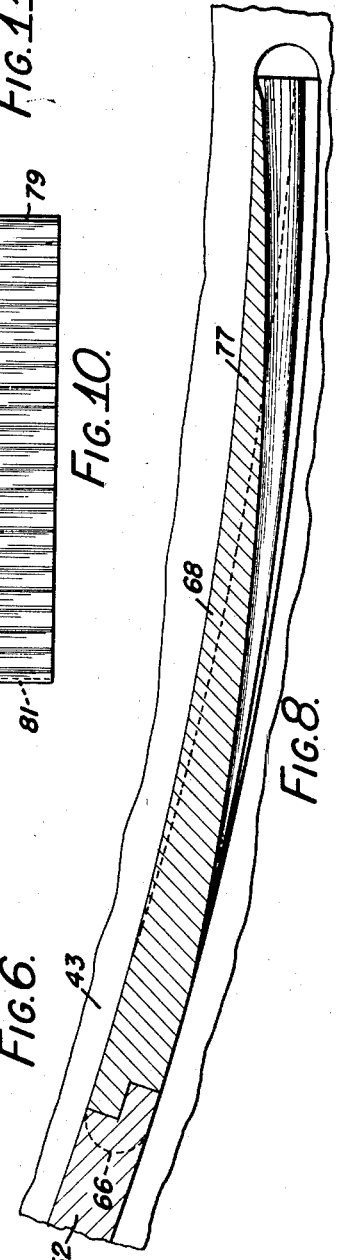
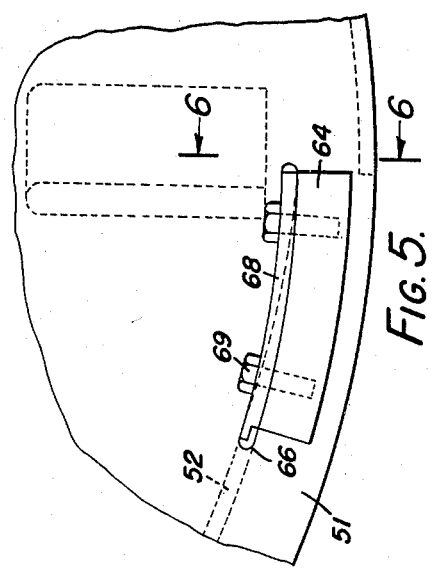
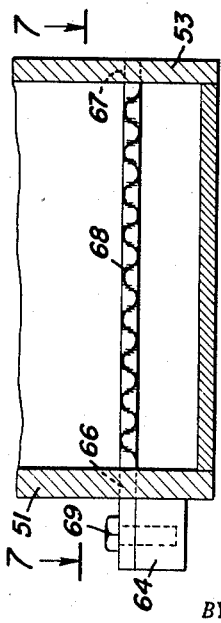
INVENTOR.
BERNARD WOODWARD, JR.
BY
ATTORNEY

# United States Patent Office 2,832,387
Patented Apr. 29, 1958

2,832,387

POTATO SLICING MACHINE

Bernard Woodward, Jr., Rochester, N. Y., assignor to F. B. Pease Company, Rochester, N. Y., a corporation of New York Application September 2, 1955, Serial No. 532,279

6 Claims. (Cl. 146—78)

My invention relates to a potato slicing machine and more particularly to a machine for producing crinkled potatoes for French frying.

An object of my invention is to provide a machine inexpensive to manufacture and efficient in operation adapted to produce from peeled whole potatoes, sliced potatoes for French frying.

Another object of my invention is to provide a machine for cutting whole peeled potatoes into crinkled sliced potatoes suitable for French frying, the machine being inexpensive to manufacture, efficient in operation and adapted to produce crinkled sliced potatoes in large quantities.

A further object of my invention is to provide a machine for slicing potatoes into frying size pieces which in effect has only one rotating element; has a continuous slicing action; and has a maximum of capacity for the size of the machine.

My invention further contemplates a machine having a casing into which whole peeled potatoes are discharged, the casing having a gap provided with a knife blade which cuts the potatoes into slabs as the potatoes are propelled through the casing and against the knife, the slabs of potatoes being forced through the casing gap into a position adjacent an annular rotating ring of radially extending knives and the external wall casing being configurated in such manner that the slabs are forced between the knives and cut into frying size pieces.

Other objects and advantages of my invention will be particularly set forth in the claims and will be apparent from the following description, when taken in connection with the accompanying drawings, in which:

Fig. 1 is a front elevation of the machine of my invention;

Fig. 3 is a sectional view taken substantially on the line 3—3 of Fig. 2 in the direction indicated by the arrows;

Fig. 5 is a view taken substantially on the line 5—5 of Fig. 2 in the direction indicated by the arrows showing the mounting for the slab slicing knife;

Fig. 6 is a sectional view taken substantially on the line 6—6 of Fig. 5 in the direction indicated by the arrows;

Fig. 7 is a sectional view taken subtantially on the line 7—7 of Fig. 6 in the direction indicated by the arrows;

Fig. 8 is a sectional view taken substantially on the line 8—8 of Fig. 7 in the direction indicated by the arrows;

Fig. 9 is an end view of one of the radially mounted slicing knives;

Fig. 10 is a plan view of Fig. 9;

Fig. 11 is an end view of Fig. 9;

Figure 2:
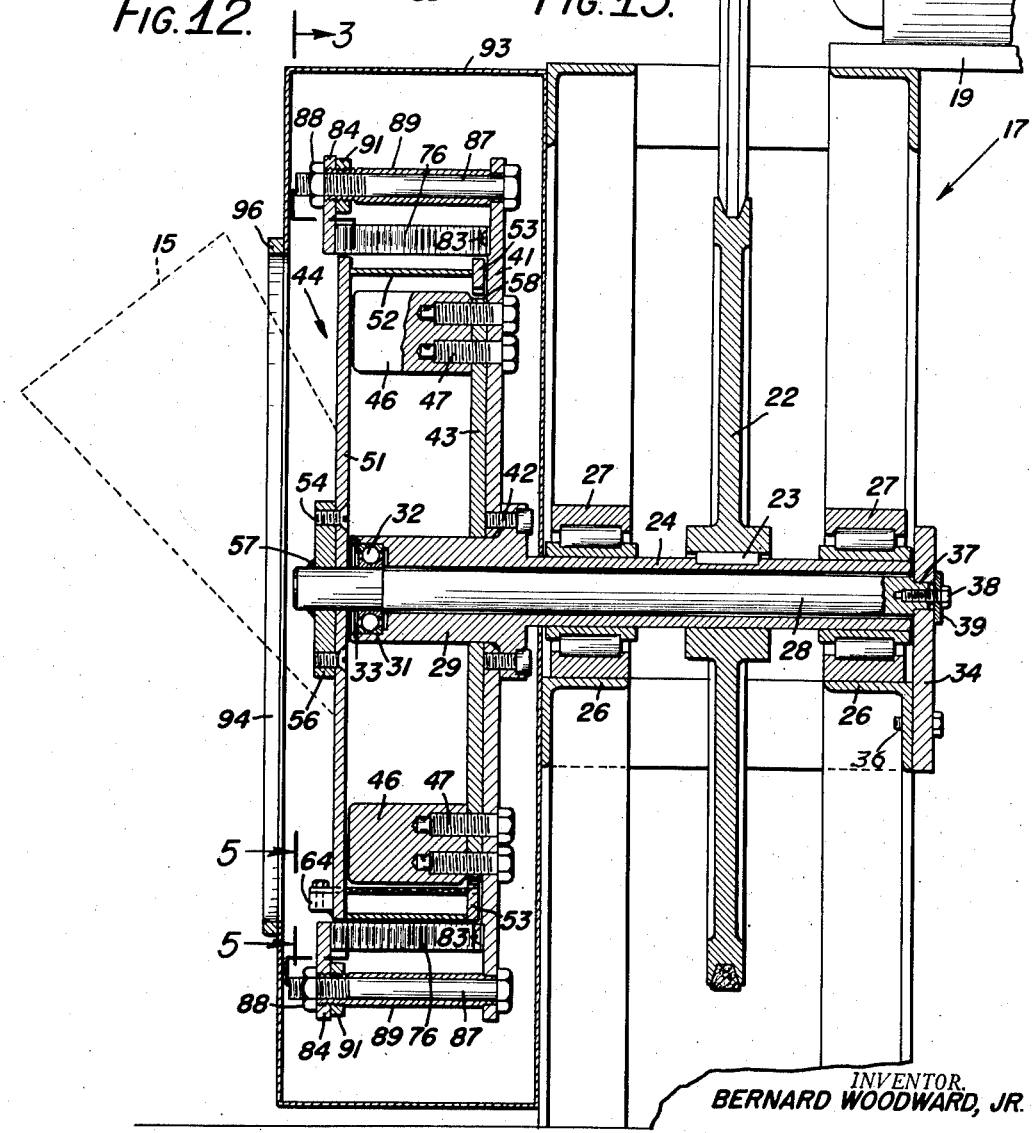
Fig. 2 is a vertical sectional view of the machine.

Referring to Figs. 1 and 2, the machine of my invention comprises, a whole peeled potato intake chute 15; a sliced potato discharge chute 16; a frame, generally indicated by the numeral 17, which carries the mechanism to be described; a driving motor 18 mounted on the frame; and suitable mechanism presently to be described for first cutting the potatoes into slabs and then slicing the slabs into frying size pieces.

The frame as appears in Figs. 1 and 2 is generally rectangular in shape and may include legs (not shown) for supporting the frame 17 at the proper height in a potato peeling, slicing and packing line. The frame may be made up of suitable angle irons or other structural shapes suitably welded or otherwise secured together to form a strong structural support for the operating mechanism.

The frame 17 carries a platform 19 upon which the motor 18 is mounted. The projecting end of the motor shaft has a pulley 21 rigidly secured thereto which is in vertical alignment with a pulley 22 keyed, as shown at 23 to a tubular rotatable drive shaft 24. A V belt passes over the pulleys 21 and 22 and drives the shaft 24. A pair of angle irons 26 are rigidly secured to the frame as by welding and support a pair of bearings 27 located on opposite sides of the pulley 22.

The shaft 24 is hollow and extending in concentric relation therewith is a stationary shaft 28 having a square end. The hollow rotatable shaft 24 has an enlarged hub 29 which has a bore 31 for receiving a bearing assembly 32, the bearing assembly being retained in the bore by a retaining ring 33. A plate 34 is bolted to the frame, as shown at 36, and has a square opening 37 therein. A screw 38 extends through the opening 37 and is threaded into the end of the stationary shaft 28. A washer 39 under the head of the screw engages the plae 34. The assembly described provides means for holding the stationary shaft rigidly at one end against rotation and against longitudinal movement with respect to the hollow shaft 24.

Figure 4:
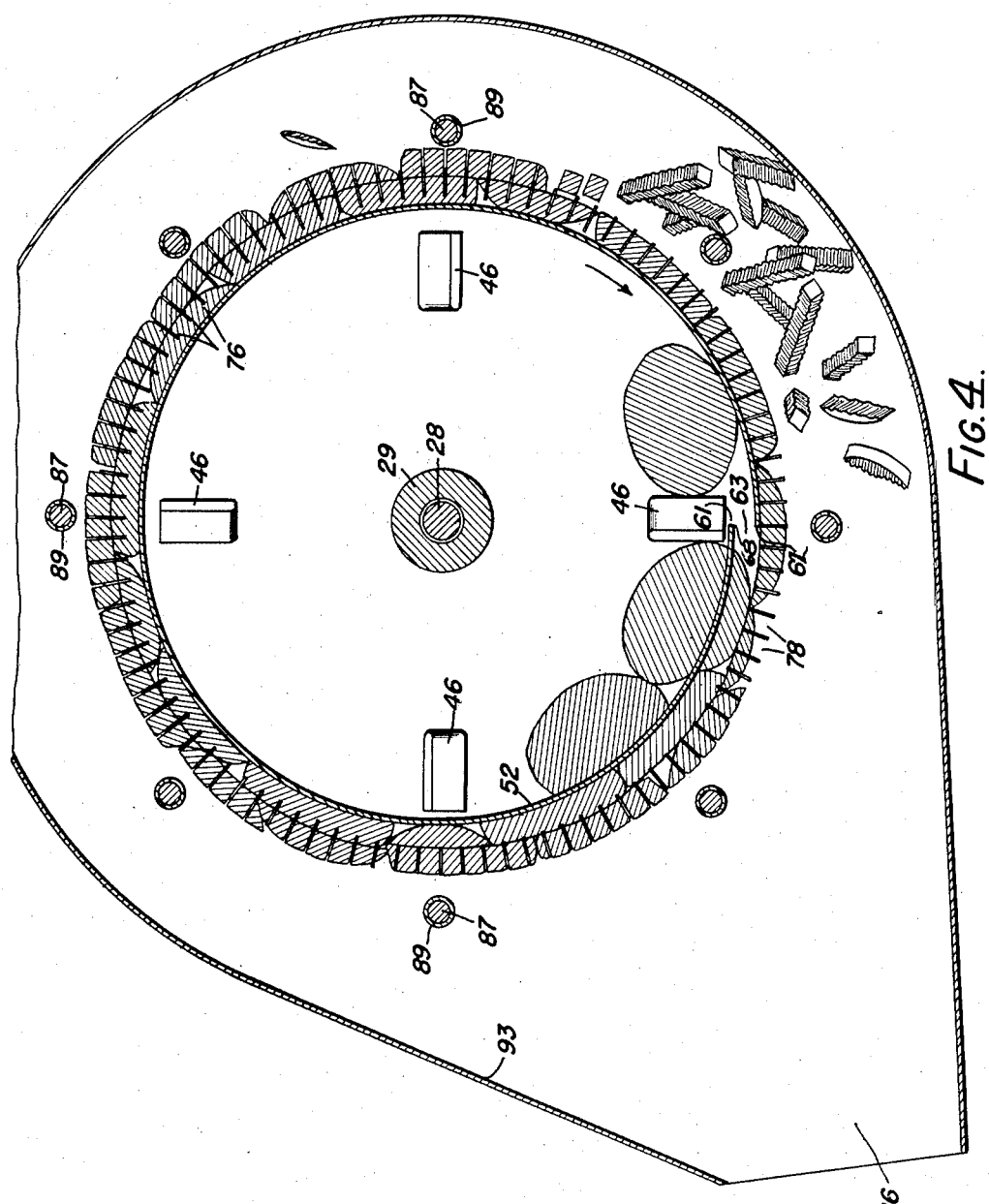
Fig. 4 is a view similar to Fig. 3 illustrating how the machine cuts the potatoes into slabs, then cuts the slabs into frying size pieces by means of radial knives and then discharges the cut slices from the knives into a discharge chute.

A plate 41 constitutes a carrier for one end of the radially extending knives, presently to be described and fits over the hub 29 and is held in position so as to be rotatable with the shaft 24 by screws 42 which extend through a flange formed on the hub 29. A plate 43 constitutes a rotatable cover for a stationary casing generally indicated by the numeral 44. The rotatable cover plate 43 carries a plurality of paddles or potato propelling devices 46 which operate in the stationary casing 44. For the purpose of mounting the paddles 46 and rendering them rotatable with the plates 41 and 43, a plurality of screws 47 extend through the plates 41 and 43 and into the paddles 46. As shown in Figs. 3 and 4 four paddles are provided although this number is optional.

The stationary parts of the casing 44 include a front wall 51, an end or peripheral wall 52 welded to the front wall and a knife support ring 53 welded to the end wall 52. The stationary front wall 51 is rigidly secured by screws 54 to a collar 56, the collar being welded to the stationary shaft 28 as indicated at 57. The knife support ring 53 has four notches 58 formed therein so that when the plates 41 and 53 and the paddles 46 are properly oriented with respect to the notches and the screw 38 removed, the entire stationary assembly comprising the casing 44 and the shaft 28 may be removed as a unit.

Referring now to Figs. 3 and 4 the stationary peripheral wall 52 extends around the axis of rotation defined by the center of the shaft 28 from an edge 61 to an edge 62 to define a spiral about the axis. These two edges 61 and 62 are then spaced from each other to define a gap 63 in the peripheral wall through which slabs of potatoes are discharged as shown in Fig. 4.

Referring now to Figs. 2, 5, 6, 7 and 8 a block 64 is welded to the side wall 51 of the casing. The side wall 51 and the knife support ring 53 have slots 66 and 67 into which a knife 68 extends. The knife has a flange part which extends beyond the margins of the slot 66 and is provided with bores through which cap screws 69 extend to attach the knife to the knife block 64 by means of threaded bores in the knife block. The knife 68 may be provided with a straight cutting edge to produce conventional pieces of potatoes for French frying. However, preferably both sides of the knife are fluted as shown at 71 and 72 (Figs. 7 and 8) to produce what may be termed "crinkled" potato slabs which are later cut, as will presently appear to produce "crinkled" frying size pieces of potatoes. These flutes taper toward each other to form a thin sharpened cutting edge. In an end or sectional view (Fig. 6) the slab cutting knife 68 resembles a sine wave.

After the knife has been sharpened it is bent on curvature which will correspond to the spiral of the wall 52 so that there is no change in direction of movement of the slab after it is cut. After the knife has been bent it is again heat treated. It will be particularly noted that there is theoretically and as a practical matter no change in velocity of the slab prior to and subsequent to being cut. This will appear more fully later. It will be further noted that the stationary shaft 28 acts as a torsion bar to absorb the shocks of slab cutting.

Referring now to Fig. 4, when the hollow shaft 24 is rotated the plates 41 and 43 are rotated to carry the whole potato around the casing into slicing relation with the stationary knife 68. It will be understood from an examination of Fig. 4, that the rotating parts including the paddles are driven at a velocity sufficient that the potatoes are thrown outward by centrifugal force and pressed against the inner side of the stationary peripheral wall 52. When a potato is driven into cutting relation with the knife 68, a slab will be cut therefrom and discharged through the gap 63, the remainder of the potato rotating with the paddles and the cover plate 43 until upon completion of a rotation that particular potato from which a slab has been previously cut will again be brought into cutting relation with the knife 68 whereupon a second slab is cut. This slab cutting operation is continued until the potato under consideration has been completely cut into slabs.

Figure 12:
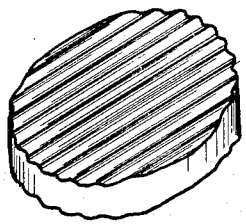
Fig. 12 is a perspective view of a potato slab cut by the slab slicing knife.

In Fig. 12 I have shown a perspective of the slab of potato cut by the knife 68. It will be appreciated that both faces of the slab have concave flutes separated by sharply defined ridges.

As shown in Figs. 3 and 4, a plurality of closely spaced knives 76 extend around the periphery of the stationary casing 44. These knives extend radially with respect to the axis of rotation and are driven by the knife carrier plate 41 at the same speed as the paddles. These knives being radially mounted between two adjacent knives have an entrance or throat 77 which is smaller in cross sectional area than the discharge or outlet 78. That is, two adjacent knives have a wider spacing from the cutting edges as they extend radially from the axis of rotation.

Each of the knives 76 is fluted when its cutting edge is viewed as shown in Fig. 9. Each knife has a pair of mounting flanges 79 and 81. These flanges have openings for the reception of headed screws 83, Fig. 2. The radially extending knives 76 are carried by the knife carrier plate 41 and a knife support ring 84.

The knife carrier plate 41 and the knife support ring 84 each have a plurality of aligned bores extending around their peripheries for the reception of bolts 87. The bolts 87 are threaded for the reception of nuts 88 by which the knife support ring 84 is supported in spaced relation to the knife carrier plate 41. Extending in concentric relation with the bolts 87 are spacing sleeves 89 one end of each of which bears against the knife carrier plate 41 and the other end of each of which is adapted to receive a nut 91.

When the radial knives 76 are mounted between the knife carrier plate 41 and the knife support ring 84 by means of screws 83, care is taken to make sure that the knives extend radially with respect to the axis of the shaft 28. If two adjacent knives are not radially mounted with respect to the axis, the entrance of throat 77 (Fig. 4) will not necessarily be smaller in cross sectional area than the discharge or outlet 78 in which case a slice of potato may jam between the adjacent knives and either not be discharged as presently will appear or bend and distort the knives. It is further desirable that the knives 76 which are made of spring steel be under tension. Thus, after the knives have been mounted by means of the screws 83 as described, nuts 88 are loosened slightly and the nuts 91 tightened against the nut support ring 84 which tends to stretch the knives and place them in tension. The assembly is provided with a shroud type housing 93 which has a front opening 94 the margin of which has a strengthening ring 96 welded thereto. The potato discharge chute 16 is formed in this housing and the whole potato intake chute 15 extends through the opening 94 and is carried in the margins of an elliptical opening 97, formed in the stationary casing plate 51.

It will now be understood that the whole peeled potatoes being more or less continuously fed into the stationary casing through the intake chute 15, are picked up and rotated by the paddles and pressed by centrifugal force against the periphery of the casing. They are then sliced into slabs, by the stationary slab cutting knife, as shown in Fig. 12. These slabs are discharged through the gap 63 into position against the cutting edges of the radially extending knives. These radially extending knives driven by means of the knife carrier plate 41 are rotating at the same speed as the speed of rotation of the paddles 46. Thus, the speed of rotation of the slabs as they are discharged through the gap 63 is essentially the same as the speed of rotation of the radial knives. With the slabs and the radial knives moving at essentially the same speed, the transition of the slab into cutting relation with the radially extending knives is smooth and gradual. Tearing of the slabs which might be the case if the speeds of rotation and the paddles and the radial knives were different is thus largely avoided.

Figure 13:
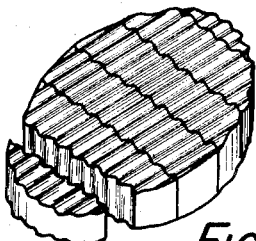
Fig. 13 is a view showing the cuts produced in the potato slab by the radially mounted knives to cut the slabs into frying size pieces.

As the radially extending knives rotate in a clockwise direction as seen in Fig. 4, the external face of the spirally extending wall 52 of the stationary casing 44, presses the slabs into cutting relation with the radial knives and the slab is completely cut as indicated in Fig. 13. Any particular slab cut by the radial knives makes one complete rotation around the axis of the shaft 28. The cut pieces then lie between the radial blades. The next slab cut by the stationary slab cutting knife 68 is projected through the gap 63 and as this slab is forced into engagement with the radial knives the pieces of the slab cut on the previous rotation are forced outward between the knives and drop into the discharge chute 16 as indicated in the drawings. Each slab cut thus makes almost two complete revolutions before being discharged unless discharged by centrifugal force.

For the purpose of simplification of the machine, I have shown a fixed discharge gap 63. Moreover the spacing of the radial knives is a constant. Thus the machine is adapted to produce only one size of crinkled slices. However, if desired means might be provided for varying the gap 63 and varying the spacing of the radial knives to vary the sizes of the pieces cut.

Moreover, if desired the knife 68 and the radial knives 76 may be straight so as to produce straight sided cut pieces of potato.

Of particular importance is the fact that both the slab cutting action and the slicing action are essentially continuous thus providing for maximum capacity. Assuming the casing is maintained full of potatoes, a slab is at all times being cut and the slices are being cut all around the periphery of the casing.

While I have shown and described the preferred form of my invention it will be apparent that various changes and modifications may be made therein particularly in the form and relation of parts without departing from the spirit of my invention as set forth in the appended claims.

I claim:

1. A potato slicing machine comprising, in combination, a rotor having substantially radial propelling devices thereon, a stationary spiral wall about the axis of rotation of said rotor, cutting means associated with the inner end of said wall, said cutting means being spaced outwardly of said propelling devices and the outer end of said wall forming a gap with said inner end and spaced substantially radially arranged knives on said rotor spaced outwardly of said wall whereby upon rotation of said propelling devices and said radial knives slabs of potatoes are first cut by said cutting means and thereafter the slabs are sliced by the spiral of said stationary wall forcing the slabs through the radial knives.

2. A potato slicing machine in accordance with claim 1 in which said radial knives extend substantially completely around the outer periphery of said stationary wall whereby the slabs of potatoes are being substantially continuously sliced as the radial knives are rotated.

3. A potato slicing machine in accordance with claim 1 in which the radial knives are of thin spring steel and extend substantially completely around the outer periphery of said stationary wall and are tensioned so that should they be distorted as the slabs are cut they will spring back to the substantially radial position.

4. A potato slicing machine in accordance with claim 1 in which the propelling means are arranged on the rotor so that the potatoes have access to substantially the entire inner periphery of said stationary wall at all times whereby potatoes are substantially continuously presented to said cutting means.

5. A potato slicing machine in accordance with claim 1 in which the propelling means are arranged on the rotor so that the potatoes have access to substantially the entire inner periphery of said stationary wall at all times whereby potatoes are substantially continuously presented to said cutting means and in which said radial knives extend substantially completely around the outer periphery of said stationary wall whereby the slabs of potatoes are being substantially continuously sliced as the radial knives are rotated.

6. A machine for slicing potatoes comprising, in combination, a casing having a peripheral wall and an opening through which whole peeled potatoes are discharged into said casing, said peripheral wall being spirally related to an axis of rotation, the spiral arrangement of said wall providing a gap between the ends of said wall, a slab cutting knife associated with the inner of the two ends of said wall at said gap, potato propelling means in said casing, means for rotating said potato propelling means and said casing including said peripheral wall with respect to each other and about said axis of rotation whereby slabs are cut from the potatoes and discharged through said gap, the potatoes having access substantially to the complete internal circumference of said peripheral wall at all times, a multiplicity of knives substantially radially mounted with respect to said axis of rotation and extending substantially completely around said axis, said knives being external of said peripheral wall and having their cutting edges directed substantially toward said axis, and means for rotating said peripheral wall and said radial knives with respect to each other whereby the peripheral wall forces the slabs outward into cutting relation with the radial knives.

References Cited in the file of this patent

UNITED STATES PATENTS

| | | |
|---|---|---|
| 2,062,689 | Weirauch | Dec. 1, 1936 |
| 2,187,957 | Urschel | Jan. 23, 1940 |
| 2,242,557 | Urschel et al. | May 20, 1941 |
| 2,288,986 | Yuhas | July 7, 1942 |
| 2,664,130 | Kubon | Dec. 29, 1953 |

FOREIGN PATENTS

| | | |
|---|---|---|
| 530,130 | Great Britain | Dec. 5, 1940 |